United States Patent [19]

Gizard

[11] Patent Number: 4,553,450
[45] Date of Patent: Nov. 19, 1985

[54] TRANSMISSION BETWEEN A POWER INPUT AND AN OUTPUT SHAFT SUITABLE FOR AN AUTOMOBILE VEHICLE

[75] Inventor: Michel Gizard, Croissy sur Seine, France

[73] Assignee: Valeo, Paris, France

[21] Appl. No.: 468,636

[22] Filed: Feb. 22, 1983

[30] Foreign Application Priority Data

Feb. 22, 1982 [FR] France .............................. 82 02888

[51] Int. Cl.$^4$ ............................................ F16H 37/00
[52] U.S. Cl. ................................ 74/689; 74/665 GE; 74/681; 74/764
[58] Field of Search ........... 74/681, 689, 764, 665 GE

[56] References Cited

U.S. PATENT DOCUMENTS

| 2,164,818 | 7/1939 | Heyer | 74/286 |
|---|---|---|---|
| 2,478,870 | 8/1949 | Heyer | 74/689 X |
| 3,203,277 | 8/1965 | General | 74/681 X |
| 3,340,749 | 9/1967 | Magg et al. | 74/689 |
| 3,538,789 | 11/1970 | Quick et al. | 74/689 |
| 4,008,628 | 2/1977 | Orshansky | 74/681 X |
| 4,290,320 | 9/1981 | Abbott | 74/689 |
| 4,305,488 | 12/1981 | McIntosh | 74/689 X |
| 4,402,237 | 9/1983 | Tomlinson | 74/681 X |

FOREIGN PATENT DOCUMENTS

| 65463 | 2/1947 | Denmark | 74/689 |
|---|---|---|---|
| 870199 | 3/1953 | Fed. Rep. of Germany . | |
| 1185883 | 1/1965 | Fed. Rep. of Germany | 74/689 |
| 1351103 | 12/1963 | France . | |
| 469758 | 7/1937 | United Kingdom | 74/681 |
| 1113709 | 5/1968 | United Kingdom . | |
| 1179207 | 1/1970 | United Kingdom . | |
| 1238612 | 7/1971 | United Kingdom . | |
| 1489317 | 10/1977 | United Kingdom . | |
| 2068064 | 8/1981 | United Kingdom . | |

Primary Examiner—Leslie A. Braun
Assistant Examiner—Joseph M. Rolnicki
Attorney, Agent, or Firm—Young & Thompson

[57] ABSTRACT

The invention provides a transmission between a power input and an output shaft, especially suitable for a motor vehicle. The transmission incorporates a speed variator and a planetary device with four elements. The planetary device comprises two planetary gears connected to one another and coupled to the power input by means of the variator, a satellite-holder adapted to be braked so as to obtain reverse motion, an output element formed by the ring and the satellite-holder, and a ring which is designed to be either left idle or, for example, braked so as to obtain two ranges of forward motion. The primary pulley of the variator is coaxial with the axis of the power input, while the secondary pulley of the variator is coaxial with the planetary device. The variator and the planetary device are located in two separate enclosures of the housing.

12 Claims, 4 Drawing Figures

TRANSMISSION BETWEEN A POWER INPUT AND AN OUTPUT SHAFT SUITABLE FOR AN AUTOMOBILE VEHICLE

BACKGROUND OF THE INVENTION

The present invention relates to a transmission between a power input and an output shaft, especially for a motor vehicle, of the kind comprising a speed variator having a primary pulley and a secondary pulley and a planetary device with four elements, in which a permanently active input element is connected to the power input by means of the speed variator, whilst a likewise permanently active output element is connected to the output shaft, each of the two remaining elements, called the first and second switching elements, being adapted to be made either active or passive by control means which make one of the switching elements active while the other is passive, and vice versa.

A switching element is said to be made active when it is connected to a member which is outside the planetary device and which is given a drive or resistant torque. In the first case, it is coupled, for example by means of a clutch, to the power input. In the second case, it is locked, especially by means of a brake which acts between it and a fixed structure. The switching element is said to be made passive when it is uncoupled from any member outside the planetary device, that is to say when it is left idle.

The speed variator can be of any suitable type, for example mechanical with pulleys of variable spacing and a belt, or hydraulic, with two units, of which one, the transmitting unit, constitutes a motor, whilst the other, a receiving unit, constitutes a pump, or electrical, etc. Such a speed variator makes it possible to establish a speed ratio and a torque ratio which are continuously variable between the primary and the secondary of the speed variator, this occurring in either direction of transmission.

The planetary device having four elements, with a permanently active element, a likewise permanently active output element and two switching elements, one of which is active while the other is passive, and vice versa, makes it possible, in association with the speed variator, to give the transmission good performances, especially as regards the dimensions of the variator, its useful life, the transmission efficiency and the extent of the speed ratios of the transmission, this being so, in particular, with two ranges of forward motion and one range of reverse motion.

These ranges of forward and reverse motion are obtained manually and/or automatically as a result of control of the clutches and brakes associated with the switching elements.

Transmissions of the kind described above, which have been proposed hitherto, give interesting results, but with an operation during which the rotational speed of the output element or of one of the switching elements is still too high to be fully satisfactory, whilst the construction is somewhat complex and bulky, with three separate parallel axes, two of which are those of the primary and the secondary of the speed variator, whilst the third is that of the planetary device.

The subject of the present invention is a transmission between a movement take-off and a receiving shaft, especially for a motor vehicle, of the type mentioned above, which is free of these disadvantages and the operation of which is excellent, with good ranges both of forward motion and of reverse motion, whilst ensuring rotational speeds of the various elements of the planetary device which are always moderate, and a simple and convenient construction of little bulk.

SUMMARY

According to one feature of the invention, in which the planetary device having four elements comprises a first and a second coaxial simple planetary train, each having a planetary gear, a ring and a satellite-holder, the satellites of which engage both with the planetary gear and with the ring, the transmission is characterised in that the planetary gears of the two trains are connected to one another and form the input element, in that the ring of the first train and the satellite-holder of the second train are connected to one another and form the output element, and in that the satellite-holder of the first train forms the first switching element, whilst the ring of the second train forms the second switching element.

The user can, as desired, obtain forward motion by releasing a brake associated with the first switching element, and reverse motion by applying this brake. In forward motion, one range can be obtained either manually or automatically by leaving the first switching element passive and by connecting the second switching element, either by means of a brake to the fixed structure, or by means of a clutch to the power input. Another forward range is obtained by coupling the first switching element to the power input by means of a clutch and by leaving the second switching element passive.

In all cases, excellent ratios are obtained in all the ranges, and excessive speeds of the elements of the planetary device are avoided. By way of example, by using brakes to make the elements switch, a speed ratio varying between 0.160 and 0.642 is obtained in the first forward range, a speed ratio varying between 0.642 and 1.730 in the second forward range and a speed ratio varying between 0.177 and 0.520 in the reverse range. It should be noted that in reverse motion there is generally relatively little interest in varying the speed ratio, and consequently it is possible, by locking the speed variator, to fix the speed ratio in reverse motion at its lowest value, that is to say 0.177. It will also be noted that only two concentric shafts are present at the output and at the input of the planetary device.

According to another feature of the invention, the transmission according to the invention is characterised in that the primary of the variator is coaxial with the power input along a first axis, whilst the secondary of the variator and the planetary device are coaxial with the output shaft along a second axis parallel to the first axis, and/or in that the variator and the planetary device are spaced axially from one another and are arranged respectively in a first and a second enclosure separated by a partition.

By means of this arrangement, the construction of the transmission is especially simple since it comprises only two axes. Moreover, the distribution of the planetary device and the speed variator in two axially separate locations enables the conditions for the control of each of these two devices to be made easier. Since these are located in two separate enclosures, it is possible, for example, to lubricate the enclosure, in which the speed variator device is located.

Preferably, the two above-mentioned features of the invention are adopted in combination, and the transmission according to the invention, in which the planetary device having four elements incorporates a first and a second coaxial and simple planetary train, each having a planetary gear, a ring and a satellite-holder, the satellites of which engage both with the planetary gear and with the ring, is characterised in that the planetary gears of the two trains are connected to one another and form the input element; in that the ring of the first train and the satellite-holder of the second train are connected to one another and form the output element; in that the satellite-holder of the first train forms the first switching element, whilst the ring of the second train forms the second switching element; in that the primary of the variator is coaxial with the movement take-off along a first axis, whilst the secondary of the variator and the planetary device are coaxial with the output shaft along a second axis parallel to the first axis; and in that the variator and the planetary device are spaced axially from one another and are arranged respectively in a first and a second enclosure separated by a partition.

This arrangement results in a transmission, the performances of which are excellent as regards the speed ratios, the speed conditions of the various elements of the planetary device, the convenience offered for control, the reduced bulk, the simplicity of construction and the possibilities presented for the presence or absence of lubrication according to practical requirements.

The clutches and brakes which are put to use for controlling the transmission can be arranged, as desired, either in the first or in the second enclosure. The clutches are advantageously coaxial with the first axis, and in this case they are connected to the planetary device preferably by drive means, for example of the chain type, which can be arranged in the first enclosure where the planetary device is located and which is designed to be suitably lubricated.

It should be noted that a free wheel can advantageously be associated with at least one of the brakes.

DETAILED DESCRIPTION OF THE PREFERRED EMBODIMENTS

Figure 1:
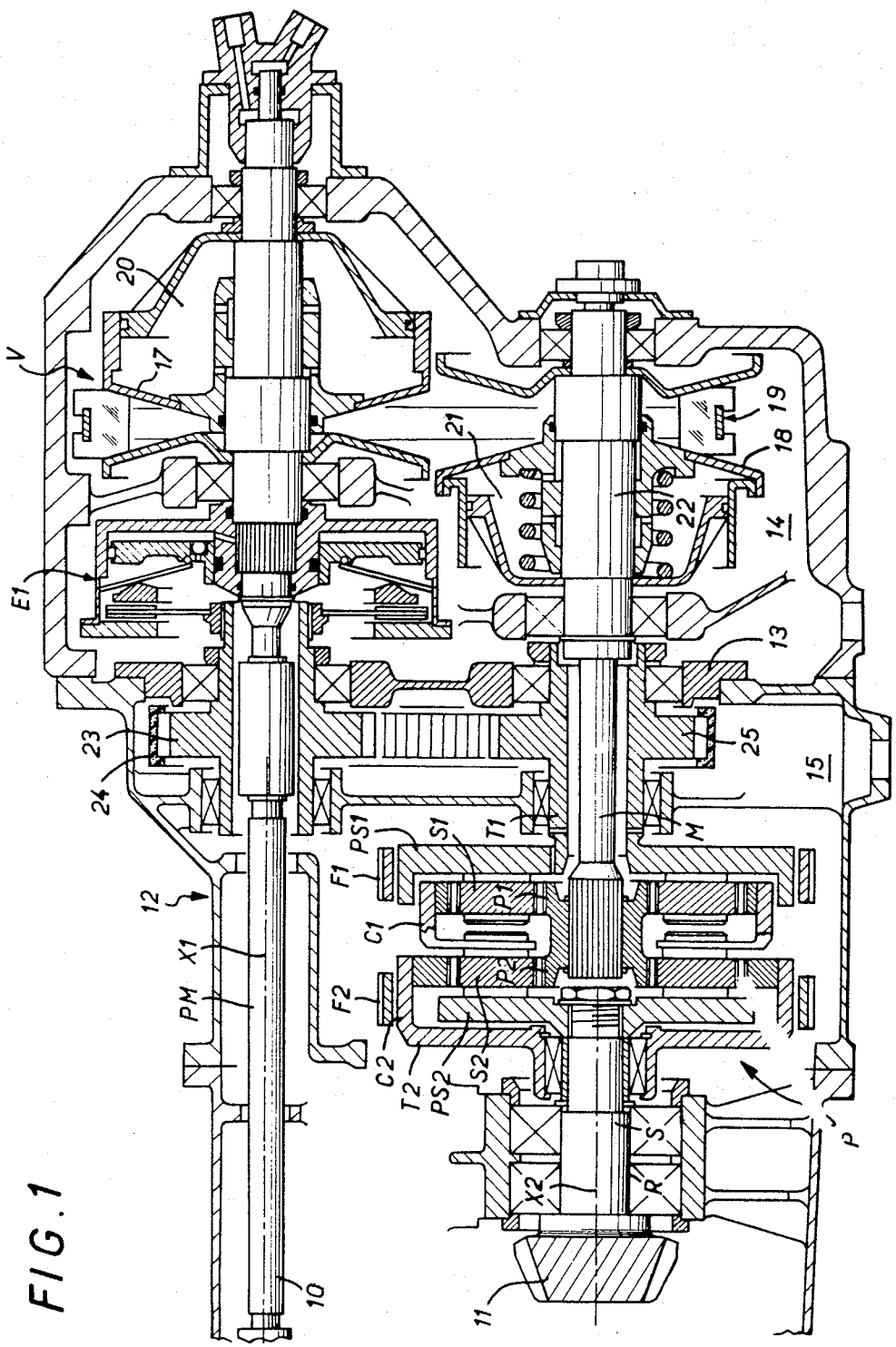
FIG. 1 is a view in longitudinal section of a transmission according to the invention.
Figure 2:
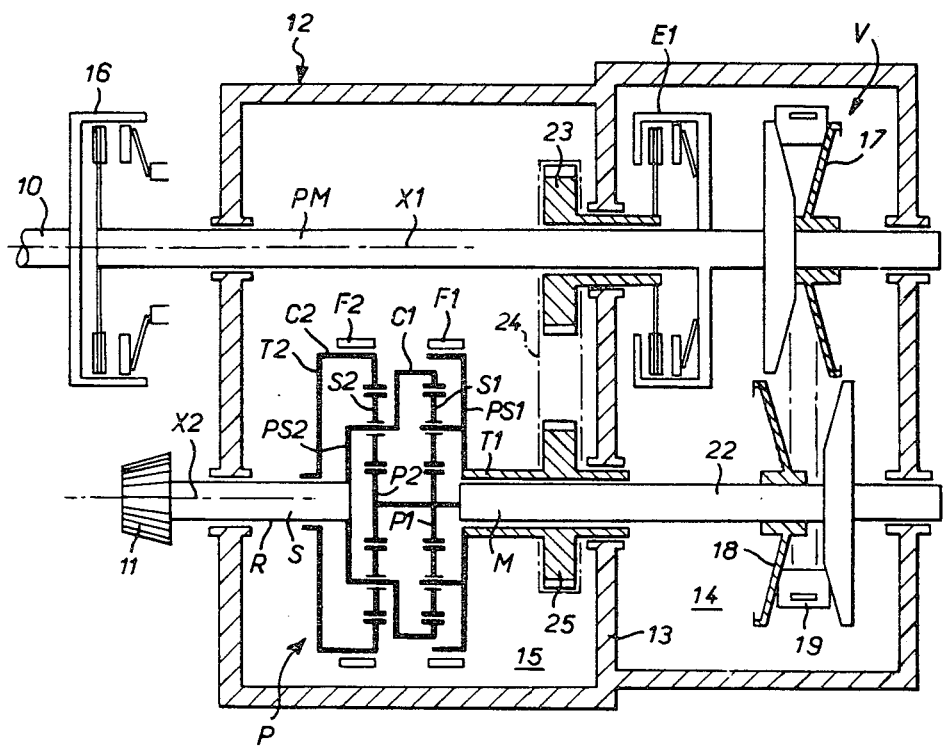
FIG. 2 is a diagram of this transmission.

Reference will first be made to FIGS. 1 and 2 which relate, by way of non-limiting example, to a use of the invention in a transmission for a motor vehicle, of which the drive shaft may be seen at 10 and a differential bevel pinion for driving the drive wheels is shown at 11. The transmission according to the invention is accommodated in a fixed housing or a fixed structure 12 divided by a partition 13 into a first enclosure 14 which is dry and into a second enclosure 15 which is lubricated. The ball bearings are shown diagrammatically by crosses in squares or rectangles.

The power input for the transmission consists of a shaft PM which is coaxial, along a first axis X1, with the drive shaft 10, whilst the output shaft R of the transmission, which carries the pinion 11, extends along a second axis X2 which is parallel to the first axis X1.

The input shaft PM of the transmission is designated to be coupled to the drive shaft 10 by means of a clutch 16 (shown in FIG. 2).

The transmission incorporates a speed variator v, the primary 17 of which is coaxial with the axis X1 and the secondary 18 of which is coaxial with the axis X2.

The speed variator V is accommodated in the first enclosure 14 of the housing 12.

In the example illustrated in FIGS. 1 and 2, the primary 17 and the secondary 18 of the variator V consist of pulleys of variable spacing which are connected by a belt 19, for example of the type consisting of a succession of studs suitably strapped on and acting by means of thrust.

When the pulley 17 has a small spacing, whilst the pulley 18 has a large spacing, as shown in FIGS. 1 and 2, the variator V allows speed multiplication. The opposite occurs when the spacings are reversed. The spacings are controlled by any suitable means, for example by means of hydraulic chambers, such as the chambers 20 and 21 in FIG. 1.

The transmission also incorporates a planetary device P having four elements M, S, T1 and T2.

This planetary device P comprises a first and a second coaxial simple planetary train. The first simple planetary train comprises a planetary gear P1, a ring C1, and a satellite-holder PS1, the satellites S1 of which engage both with the planetary gear P1 and with the ring C1. In a similar way, the second simple planetary train comprises a planetary gear P2, a ring C2 and a satellite-holder PS2, the satellites S2 of which engage both with the planetary gear P2 and with the ring C2.

The planetary gears P1 and P2 of the two trains are connected to one another and form the input element M of the planetary device P. This input element M is permanently active, being connected to the input shaft PM by means of the speed variator V. More particularly, the planetary device P, which is coaxial with the second axis X2, has its input element M connected by a shaft 22 to the secondary 18 of the variator V.

The ring C1 of the first train and the satellite-holder PS2 of the second train are connected to one another and form an output element S of the planetary device P. This output element S is permanently active, being fixed to the output shaft R of the transmission.

The satellite-holder PS1 of the first train forms a first switching element T1 of the planetary device P. The ring C2 of the second train forms a second switching element T2 of the planetary device P.

Each of the switching elements T1 and T2 is designed to be made either active or passive by control means which make one of the switching elements active while the other is passive, and vice versa.

The first switching element T1 can be made active in two ways, on the one hand by means of a brake F1 which, when it is applied, connects it to the fixed housing 12 and ensures reverse motion, and on the other hand, when the brake F1 is released, by means of a clutch E1 which, when it is engaged, ensures a second range of forward motion, namely a high forward range in the example of FIGS. 1 and 2.

The clutch E1 is located in the first enclosure 14 of the housing 12 and acts between the input shaft PM and a pinion 23 mounted freely around this input shaft PM. By a drive means, such as a chain 24, the pinion 23 drives a pinion 25 fixed to the element T1. The drive means 23, 24, 25 are located in the second enclosure 15 of the housing 12 and are therefore well lubricated at the same time as the elements of the planetary device P.

The second switching element T2 is designed to be made active so as to obtain a first range of forward motion which is a low forward range, whilst the brake F1 is released, being connected to the fixed housing 12 by a brake F2 which is located in the second enclosure 15 of the housing 12.

By means of a control which can be manual or automatic, the low forward range is obtained by releasing the brake F1, whilst the clutch E1 is disengaged and the brake F2 is applied. This low forward range corresponds to a variation in the ratio of between 0.160 and 0.642.

To obtain the high forward range by means of a manual or automatic control, the brake F2 is released and the clutch E1 is engaged, whilst the brake F1 is released. This high forward range corresponds to a variation in the ratio of between 0.642 and 1.730.

It will thus be noted, in forward motion, that the efficiency of the transmission is improved in relation to a transmission which only incorporates one variator.

For reverse motion, the user applies the brake F1 whilst the clutch E1 and the brake F2 are released. The element T1 is made active by being locked on the housing 12, whilst the element T2 is left passive. A range of reverse motion which corresponds to a variation in the ratio of between 0.177 and 0.520 is obtained.

In general, it is not necessary, in reverse motion, to provide a variation in the transmission ratio, and consequently it is possible, in the case of reverse motion, to lock the variator V in its position which corresponds to the lowest ratio, that is to say 0.177. This can easily be effected automatically.

It will be noted that, under these conditions, both in reverse motion and in forward motion the rotational speed of any one of the elements of the planetary device P never exceeds twice the rotational speed of the input shaft PM.

It will be noted that F1 is never applied when E1 is engaged.

It will be understood that the transmission which has just been described with reference to FIGS. 1 to 3 has excellent performances as regards the speed ratios, the speed conditions of the various elements, M, S, T1, T2 of the planetary device P, the convenience offered for control, the reduced bulk, the simplicity of construction and the possibilities presented for the presence or absence of lubrication according to practical requirements.

It will also be understood that the ratio between the maximum rotational speed and the minimum rotational speed of the output shaft R advantageously has a very high value.

In an alternative form (FIG. 3), the arrangement is similar to that which has just been described with reference to FIGS. 1 and 2, but the switching element T2, instead of being made active by being locked on the fixed structure by a brake, such as the brake F2, is made active, here, by being coupled to the input shaft PM.

This coupling is made by pinions 23' and 25' and a chain 24' which are similar to the drive means 23, 24, 25 and which are, like the latter, accommodated in the lubricated enclosure 15 of the housing 12. The pinion 23' can be coupled to the input shaft PM by a clutch E2 coaxial with the axis X1.

As in FIGS. 1 and 2, reverse motion is obtained by applying the brake F1, and forward motion is obtained by releasing the brake F1, but here the second high forward range is obtained by making the switching element T1 active as a result of the engagement of the clutch E1 and by making the switching element T2 passive as a result of disengagement of the clutch E2. The first low forward range is obtained by making the switching element T1 passive as a result of disengagement of the clutch E1 and by making the switching element T2 active as a result of engagement of the clutch E2.

Figure 3:
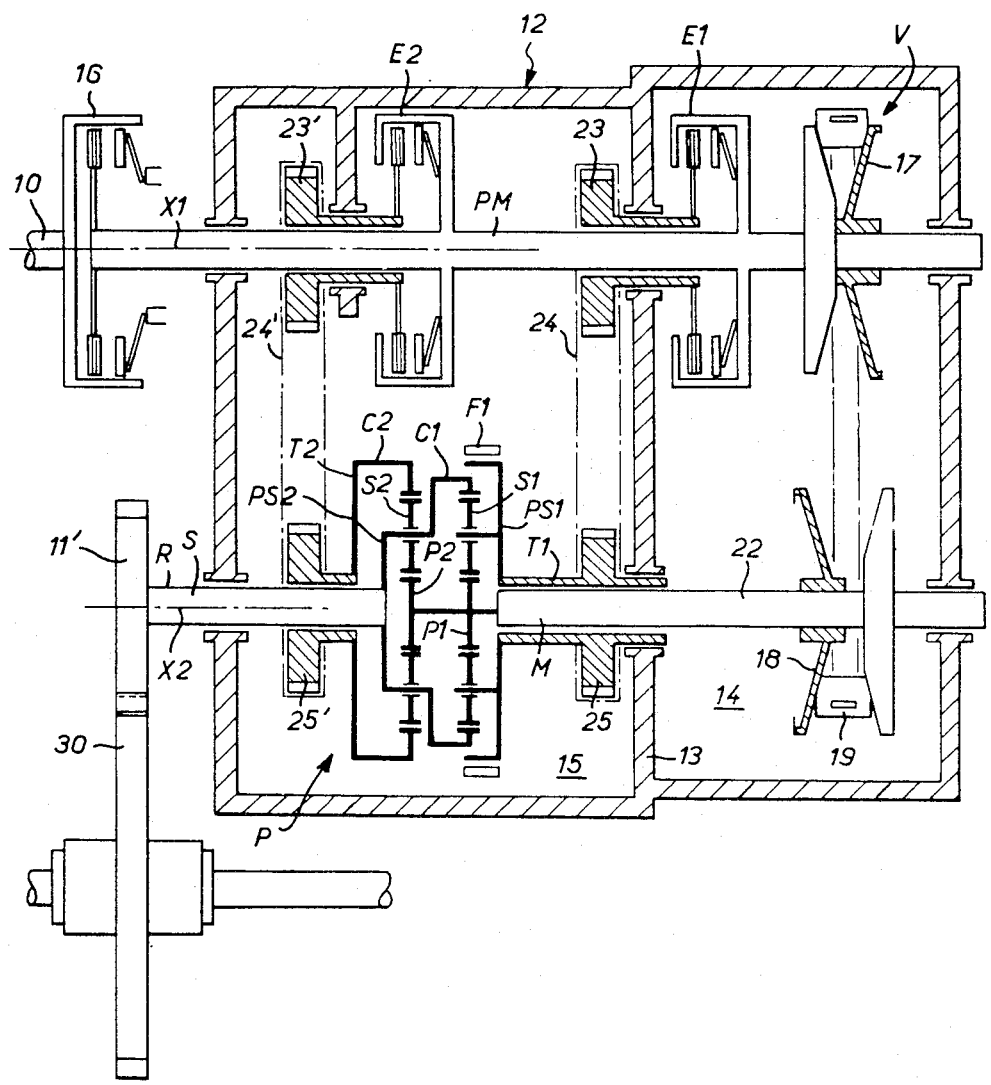
FIG. 3 is a diagram similar to that of FIG. 2, but relating to an alternative form.

The performances and construction of the transmission shown in FIG. 3 are excellent in the same respect as those described with reference to FIGS. 1 and 2, and even with a high efficiency.

In FIG. 3, the output shaft R of the transmission carries not a differential bevel pinion, such as the pinion 11, but a straight pinion 11' which engages with another pinion 30 for driving the drive wheels of the vehicle.

Figure 4:
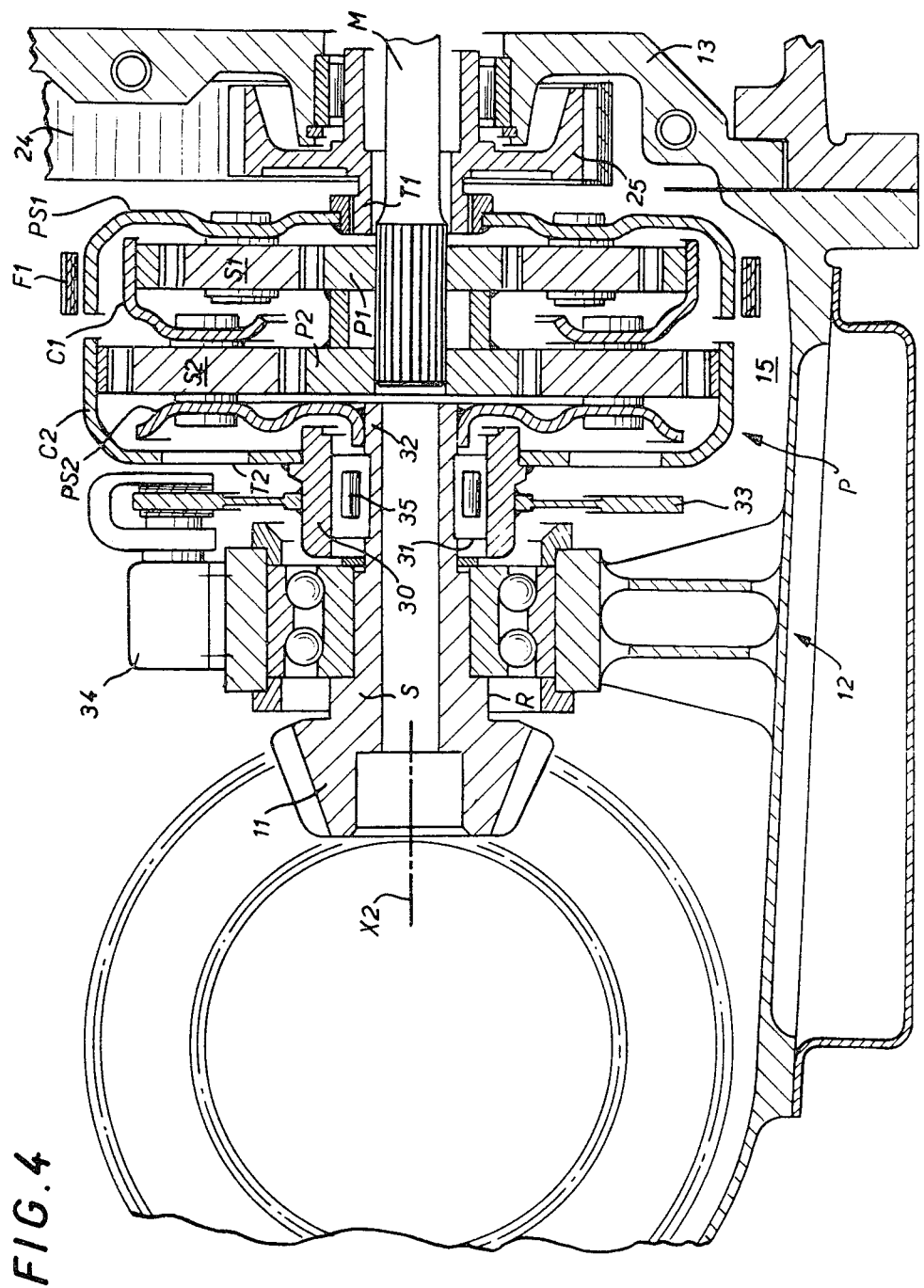
FIG. 4 shows a modified detail of the transmission of FIG. 1.

In an alternative form illustrated in FIG. 4, the switching element T2 is made active by a device with a free wheel and a brake.

According to this alternative form, the ring C2 is fixed to the outer race or receptacle 30 of a one-way clutch 31, of which the inner ring fixed to the output element S may be seen at 32 and the locking rollers shown diagrammatically may be seen at 35.

The receptacle carries a disc 33 intended to be clamped by a disc brake 34 fixed to the housing 12, being fastened to the latter, for example by screwing.

As in FIGS. 1 to 3, reverse motion is obtained by applying the brake F1, and forward motion is obtained by releasing this brake F1, but here the low forward range is obtained by clamping the disc 33, thus causing the ring C2 to be immobilised by means of the free wheel 31. The switching element T2 is thus made active, whilst, as before, the switching element T1 is passive as a result of disengagement of the clutch E1.

The high forward range is obtained by releasing the brake 34 which frees the disc 33 and allows the ring C2 to rotate. The switching element T2 is then made passive, whilst the switching element T1 is active as a result of engagement of the clutch E1.

The range of reverse motion is obtained by unclamping the disc 33, thus making the element T2 passive, whilst the switching element T1 is made active as a result of application of the brake F1.

It will be noted that the brake is applied solely in the low forward range and that better adjustment is obtained during the transition from the low forward range of the high forward range, and vice versa, as regards the release of the brake and the engagement of the clutch, and vice versa.

I claim:

1. A transmission for transmitting power from a power input shaft to an output shaft, said transmission being mounted in housing and comprising a variable speed pulley drive having a driving pulley, a driven pulley and a transmission belt therebetween, the driving pulley being directly driven by the power input shaft, a planetary gear unit having four elements including a permanently active input element connected to the driven pulley and a permanently active output element connected to said output shaft, and first and second switching elements, control means for making a selected one of said switching element active while the non-selected is passive and making the non-selected one active while the selected one is passive, said planetary gear unit comprises first and second simple planetary gear trains, each of said planetary gear trains comprising a planetary gear, a ring gear and a satellite carrier having satellite gears meshing with the associated planetary gear and the ring gear, the planetary gears of said planetary gear trains being connected together and define the input element, the ring gear of said first planetary gear train and the satellite carrier of the second planetary gear train being connected to each other and define the output element, the satellite carrier of said first planetary gear train defining the first switching element and the ring gear of the second planetary gear train defining said second switching element, said control means comprising a clutch and a drive means for connecting the power input shaft to said satellite carrier of said first planetary gear, and a brake for fixing said satellite carrier of the first planetary gear against rotation to obtain a reverse drive, said clutch being engageable to define a forward gear range and disengageable when said brake fixes said satellite carrier of the first planetary gear train against rotation.

2. A transmission according to claim 1, wherein the driving pulley is coaxial with the power input shaft and the driven pulley and the planetary gear unit are coaxial with an output shaft and parallel to said input shaft.

3. A transmission according to claim 1, wherein said variable speed pulley drive and said clutch are housed in a first enclosure of said housing, and said planetary unit, said drive means and said brake are arranged in a second enclosure containing a lubricant, a partition separating said first and second enclosures.

4. A transmission according to claim 1, wherein said ring gear of said second planetary gear train defining said second switching element is made active to provide a forward low gear range.

5. A transmission according to claim 4, wherein said control means for said second switching element comprises another brake for fixing said ring gear of said second planetary gear train against rotation for providing another forward gear range.

6. A transmission according to claim 5, wherein said control means for said second switching element comprises a one-way clutch associated with said other brake.

7. A transmission according to claim 6, wherein said last-mentioned brake comprises a brake disc fixed to an outer race of said one-way clutch and a cooperable braking member mounted on said housing, the one-way clutch having an inner race fixed to said output shaft.

8. A transmission according to claim 3, wherein said control means for said second switching element comprises another clutch and another drive means connected between said input power shaft and said ring gear of said second planetary gear train, said clutch being engageable to make said second switching element active and disengageable to make the second switching element passive.

9. A transmission according to claim 5, wherein said variable speed pulley drive and said clutch are housed in a first enclosure of said housing, and said planetary unit said drive means and said brake and said other brake are arranged in a second enclosure containing a lubricant, a partition separating said first and second enclosures.

10. A transmission according to claim 8, wherein said variable speed pulley drive and said first-mentioned clutch are housed in a first enclosure in said housing and said planetary unit, said first-mentioned drive means, said brake, and said other clutch and said other drive means are arranged in a second enclosure containing a lubricant, a partition separating said first and second enclosures.

11. A transmission according to claim 1, wherein said drive means comprises an endless transmission element.

12. A transmission according to claim 1, wherein said drive means comprises sprocket and chain means.

* * * * *